(12) United States Patent
Suzuki

(10) Patent No.: US 9,878,408 B2
(45) Date of Patent: Jan. 30, 2018

(54) MACHINE TOOL

(71) Applicant: MAKINO MILLING MACHINE CO., LTD., Tokyo (JP)

(72) Inventor: Kenichiro Suzuki, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 0 days.

(21) Appl. No.: 15/021,644

(22) PCT Filed: Sep. 13, 2013

(86) PCT No.: PCT/JP2013/074928
§ 371 (c)(1),
(2) Date: Mar. 11, 2016

(87) PCT Pub. No.: WO2015/037155
PCT Pub. Date: Mar. 19, 2015

(65) Prior Publication Data
US 2016/0221134 A1    Aug. 4, 2016

(51) Int. Cl.
*B23Q 1/01*        (2006.01)
*B23Q 5/34*        (2006.01)
(Continued)

(52) U.S. Cl.
CPC .............. *B23Q 1/017* (2013.01); *B23Q 1/01* (2013.01); *B23Q 1/012* (2013.01); *B23Q 1/015* (2013.01);
(Continued)

(58) Field of Classification Search
CPC .......... B23Q 1/01; B23Q 1/012; B23Q 1/015; B23Q 1/017; B23Q 5/34; B23Q 5/36;
(Continued)

(56) References Cited

U.S. PATENT DOCUMENTS 3,656,860 A * 4/1972 Neuman ............ B23Q 11/0014
                                                    408/234
4,229,866 A * 10/1980 Berthier ................ B23Q 1/012
                                                    29/26 A
(Continued)

FOREIGN PATENT DOCUMENTS

EP         2 308 635         4/2011
JP         4-136634         12/1992
(Continued)

OTHER PUBLICATIONS

International Search Report dated Oct. 29, 2013, directed to International Application No. PCT/JP2013/074928; 2 pages.

*Primary Examiner* — Ryan Rufo
(74) *Attorney, Agent, or Firm* — Morrison & Foerster LLP

(57) ABSTRACT

A machine tool which causes a tool mounted on a main spindle and workpiece attached to a table to move relative to each other so as to machine the workpiece, said machine tool being equipped with: a column that has guides for guiding movements in the vertical direction, that is, the direction of gravity; and a moving body that supports a spindle head at the front and moves in the vertical direction along the guides. The guides comprise a pair of right and left first guides and at least one second guide that is provided on the inner side of and posterior to the pair of first guides.

5 Claims, 5 Drawing Sheets

(51) Int. Cl.
 *B23Q 5/36* (2006.01)
 *B23Q 5/40* (2006.01)
(52) U.S. Cl.
 CPC .................. *B23Q 5/34* (2013.01); *B23Q 5/36* (2013.01); *B23Q 5/40* (2013.01)
(58) Field of Classification Search
 CPC ............. B23Q 5/40; Y10T 409/309744; Y10T 409/3098; Y10T 409/309688
 See application file for complete search history.

(56) References Cited

U.S. PATENT DOCUMENTS

| | | | | |
|---|---|---|---|---|
| 4,658,485 | A * | 4/1987 | Yang | B23Q 1/012 29/26 A |
| 7,201,546 | B2 * | 4/2007 | Ichino | B23Q 11/0035 408/143 |
| 7,264,581 | B1 * | 9/2007 | Lai | B23Q 1/012 409/212 |
| 7,591,619 | B1 * | 9/2009 | Chang | B23C 1/002 409/158 |
| 2002/0176757 | A1 * | 11/2002 | Saito | B23Q 1/017 409/135 |
| 2003/0190206 | A1 * | 10/2003 | Sugata | B23Q 1/015 409/235 |
| 2006/0008335 | A1 * | 1/2006 | Furuhashi | B23Q 1/012 409/202 |
| 2008/0254959 | A1 * | 10/2008 | Takayama | B23Q 1/5412 483/32 |
| 2010/0024206 | A1 * | 2/2010 | Mizuta | B23Q 1/012 29/700 |
| 2012/0134762 | A1 * | 5/2012 | Wang | B23Q 11/0028 409/166 |

FOREIGN PATENT DOCUMENTS

| | | | | |
|---|---|---|---|---|
| JP | 5-80632 | | 11/1993 | |
| JP | 9-269005 | | 10/1997 | |
| JP | 11-235631 | | 8/1999 | |
| JP | 2000-24853 | | 1/2000 | |
| JP | 2003-326429 | | 11/2003 | |
| JP | 2005-153121 | | 6/2005 | |
| JP | 2006-239854 A | * | 9/2006 | ............... B23Q 1/64 |
| JP | 2012-40620 | | 3/2012 | |
| JP | 2012-56007 | | 3/2012 | |
| JP | 2012-143819 A | * | 8/2012 | ............. B23Q 11/00 |
| KR | 10-2012-0015992 | | 2/2012 | |
| WO | WO 2011/050750 A1 | * | 5/2011 | ........... B23Q 1/4804 |

* cited by examiner

MACHINE TOOL

CROSS REFERENCE TO RELATED APPLICATIONS

This application is a U.S. National Stage patent application of International Patent Application No. PCT/JP2013/074928, filed Sep. 13, 2013, which is hereby incorporated by reference in the present disclosure in its entirety.

FIELD OF THE INVENTION

The invention relates to a machine tool including a spindle head, mounted to a column for up-and-down movement, for rotationally supporting a spindle to which a tool is attached.

BACKGROUND OF THE INVENTION

Patent Literature 1 discloses a machine tool including a spindle head, mounted to a column for up-and-down movement, for rotationally supporting a spindle at the end of which a tool is attached, the machine tool machining a workpiece, attached to a table, by relatively moving the tool and the workpiece in three axes of X-, Y- and Z-axes.

The machine tool described in Patent Literature 1 includes a cross rail disposed on a column for up-and-down movement. A saddle is mounted to the cross rail for horizontal left-and-right movement. The spindle head is mounted to the saddle.

The cross rail is guided in the up-and-down direction by a Z-axis guide, including a rolling type guide and sliding type guide. The rolling type guide includes a pair of guide rails disposed at the left-and-right ends of the column and extending in the up-and-down direction and rolling guide units mounted to the back of the cross rail to engage the guide rails. The sliding type guide includes sliding surfaces disposed on side faces of the column and formed perpendicular to the guiding surfaces of the rolling type guide, and sliders mounted to the side faces of the cross rail to slide along the sliding surfaces.

PRIOR ART DOCUMENTS

Patent Literature 1: JP-A-2003-326429

SUMMARY OF THE INVENTION

In the machine tool of Patent Literature 1, the cross rail is guided in the up-and-down direction at the ends of the cross rail. If a moving body, which supports a spindle head for rotationally supporting a spindle to which a tool is attached, is guided at the ends the moving body in the up-and-down direction, i.e., the vertical direction, as described above, the moving body is deformed, in particular twisted, by the weight of the moving body and the spindle head. The deformation, even if it is small, may cause a large error at the end of the spindle. If the rigidity of a moving body is increased to prevent the deformation, then the weight of the moving body is increased, hindering high speed and highly accurate feeding of the moving body.

The invention is directed to solve the above-described problems of the prior art, and the objective of the invention is to provide a machine tool improved to prevent the deformation of a moving body or a slider, mounted to a column for up-and-down movement, for supporting a spindle head.

In order to achieve the above described objective, the invention provides a machining tool for machining a workpiece, which is attached to a table, by moving a tool attached to a spindle and the workpiece relative to each other, the machine tool comprising a column having at least three guides for guiding in up-and-down direction that is the direction of gravity, a moving body moving along the guides, and at a front side thereof supporting a spindle head, the guide including a pair of right-and-left first guides and at least one second guide disposed inward and rearward relative to the pair of first guides.

According to the invention, the disposition of the at least one second guide inward and rearward relative to the first guides allows the back of the moving body, which moves in the up-and-down direction, to be restrained by the pair of left-and-right first guide and the second guide behind them, preventing or reducing the deformation, in particular the twisted deformation of the moving body.

With reference to the drawings, a preferred embodiment of the invention will be described below.

Figure 1:
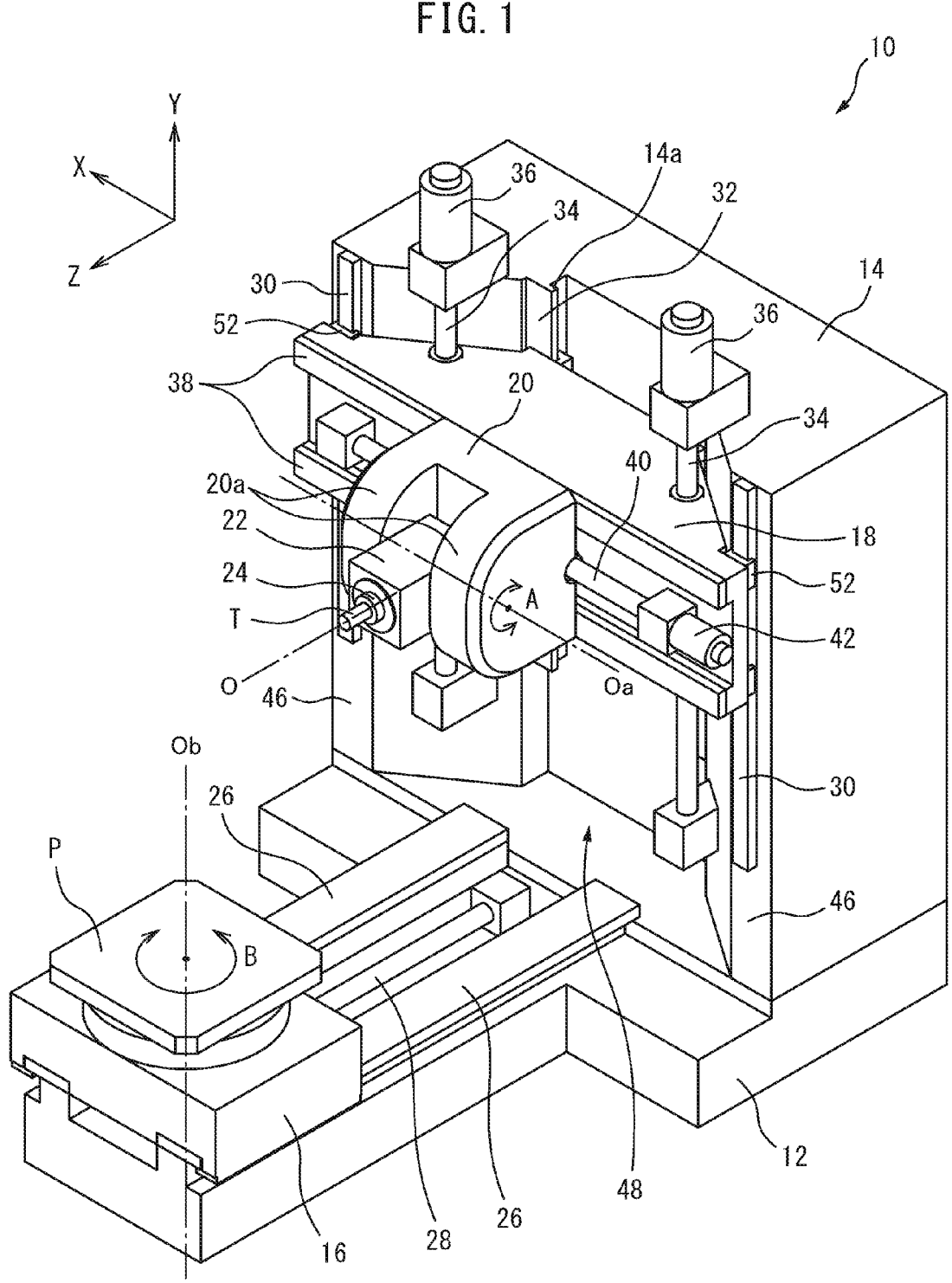
FIG. 1 is a perspective view of a machine tool according to a preferred embodiment of the invention.

With reference to FIG. 1, a machine tool 10 according to a preferred embodiment of the invention forms a horizontal machining center, and comprises a bed 12 providing a base secured to a floor of a factory, a table 14 provided on the top face of the bed 12 at the front portion (near side) thereof for horizontal front-and-rear movement or movement in Z-axis direction, a column 14 fixed to the top face of the bed 12 at the rear portion (far side) thereof, a Y-axis slider 18, provided, as a moving body in the direction of the gravity force, i.e., an up-and-down direction, on the front face of the column 14, an X-axis slider 20 provided on the front face of the Y-axis slider 18 for horizontal left-and-right movement or movement in X-axis direction and a spindle head 22 mounted to the X-axis slider 18 for rotationally supporting a spindle 24.

Figure 4:
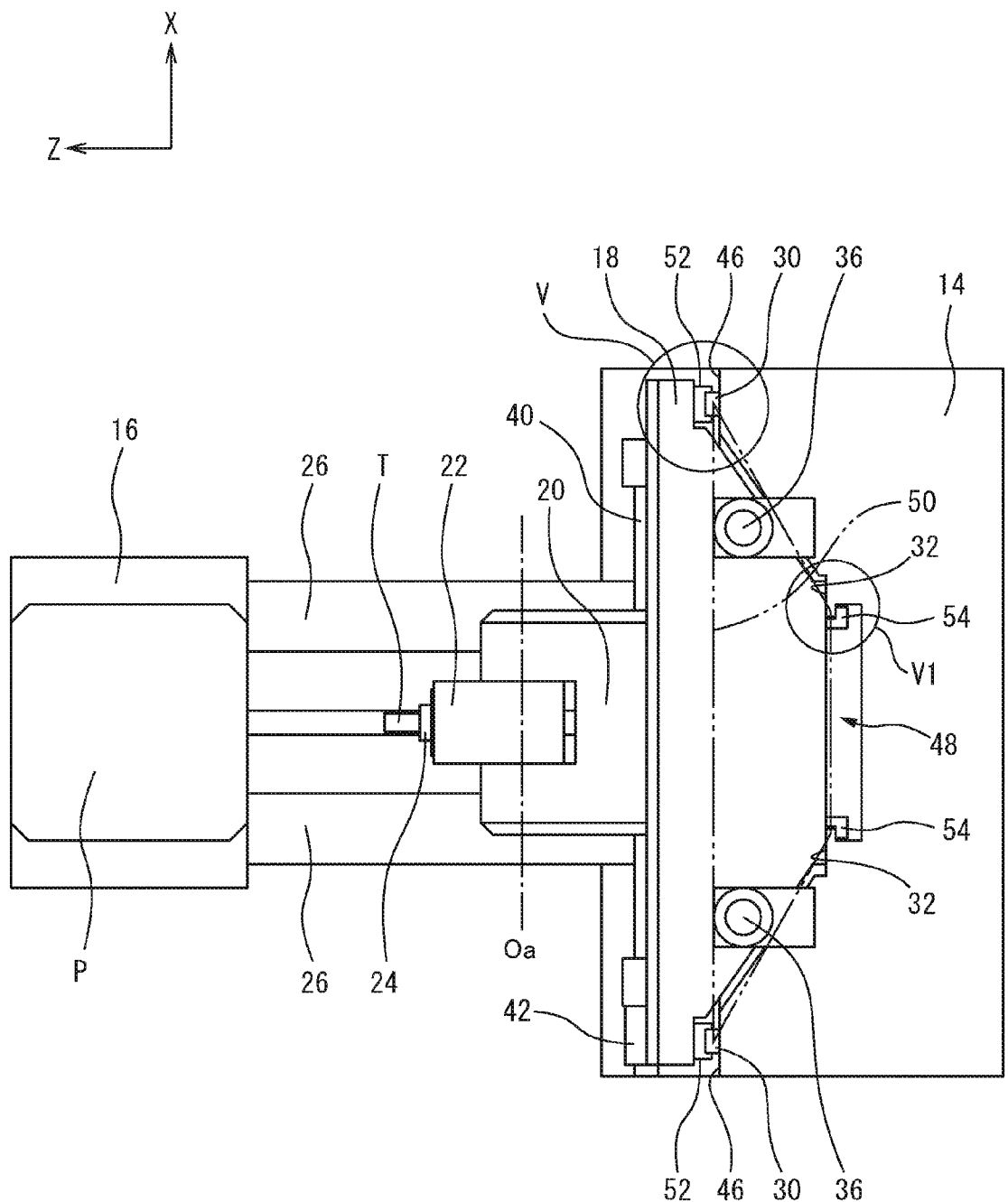
FIG. 4 is a plan view of the machine tool of FIG. 1.
Figure 5:
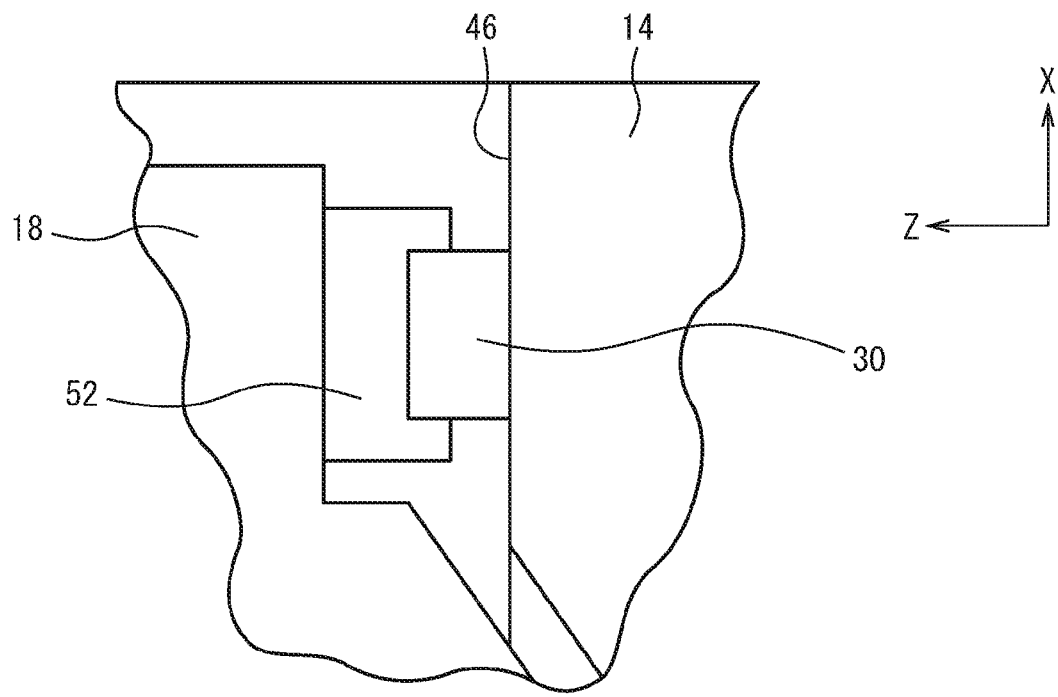
FIG. 5 is an enlarged view of a portion indicated by V in FIG. 4.

The column 14 defines a recess 48 and a protrusions 14a inwardly extending from side walls of the recess 48. With reference to FIGS. 1 and 4, the recess 48 has a section perpendicular to the Y-axis, which is substantially a trapezoidal shape tapering in the direction from the front side to the rear side of the column 14. A pair of Y-axis guide rails 30, providing a first guide, are mounted to the column 14 on front franks 46, provided outside the recess 48 in the X-axis direction.

Further, at least one, in this embodiment a pair of guide surfaces 32 are provided, as a second guide, in the recess 48 so as to forwardly face in the Z-axis direction and to extend in the Y-direction. The protrusions 14a extend in the X-axis direction so as to form extensions of the guide surfaces 32. The protrusions 14a defines front faces, flush with the guide surfaces 32, and rear faces opposite to the front faces. In this embodiment, the Y-axis guide rails 30 and the guide surfaces 32 form a guide for guiding the Y-axis slider 18, i.e., the moving body, in the direction of the gravity, i.e., the up-and-down direction.

Figure 2:
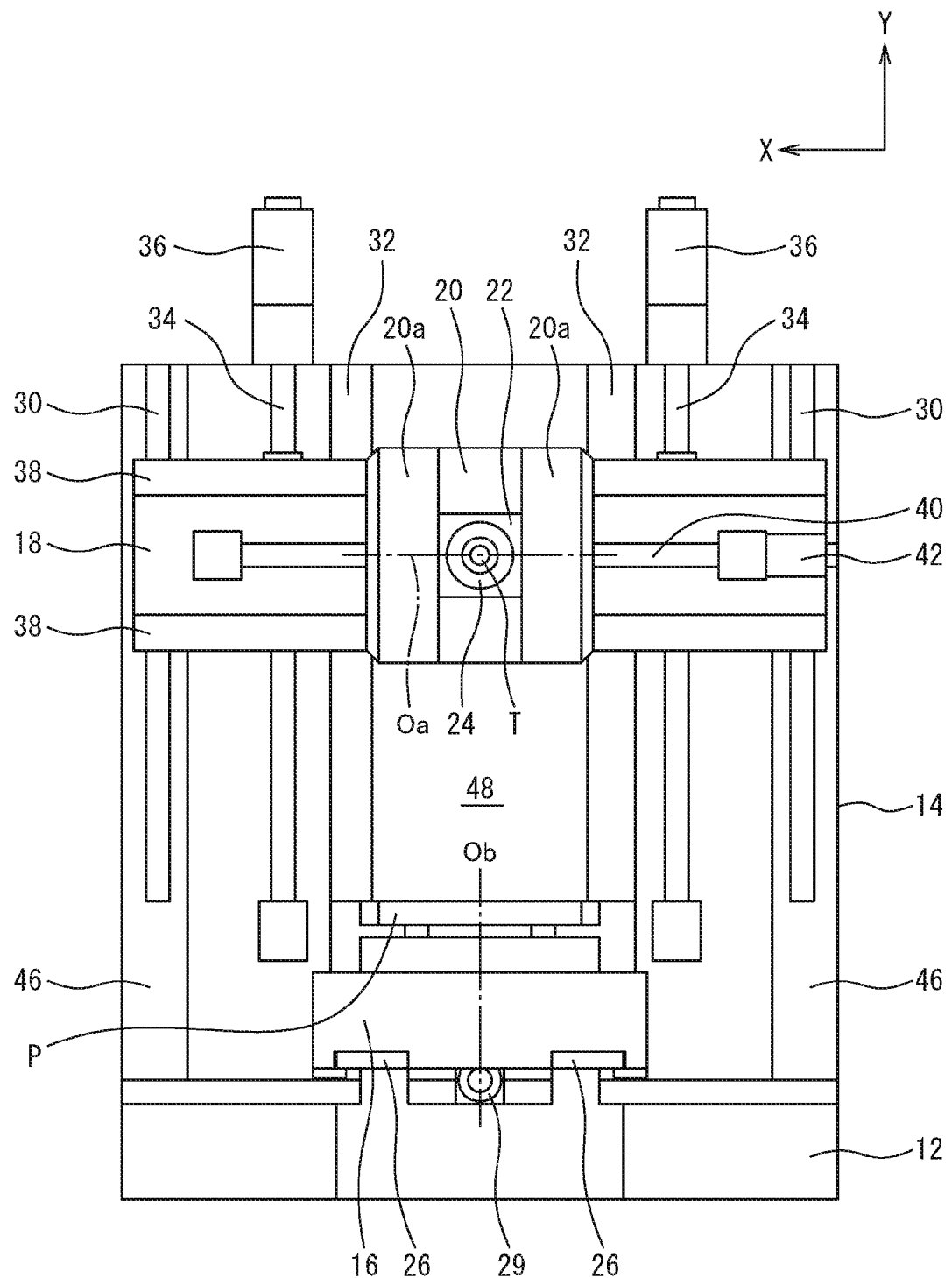
FIG. 2 is a front view of the machine tool of FIG. 1.
Figure 3:
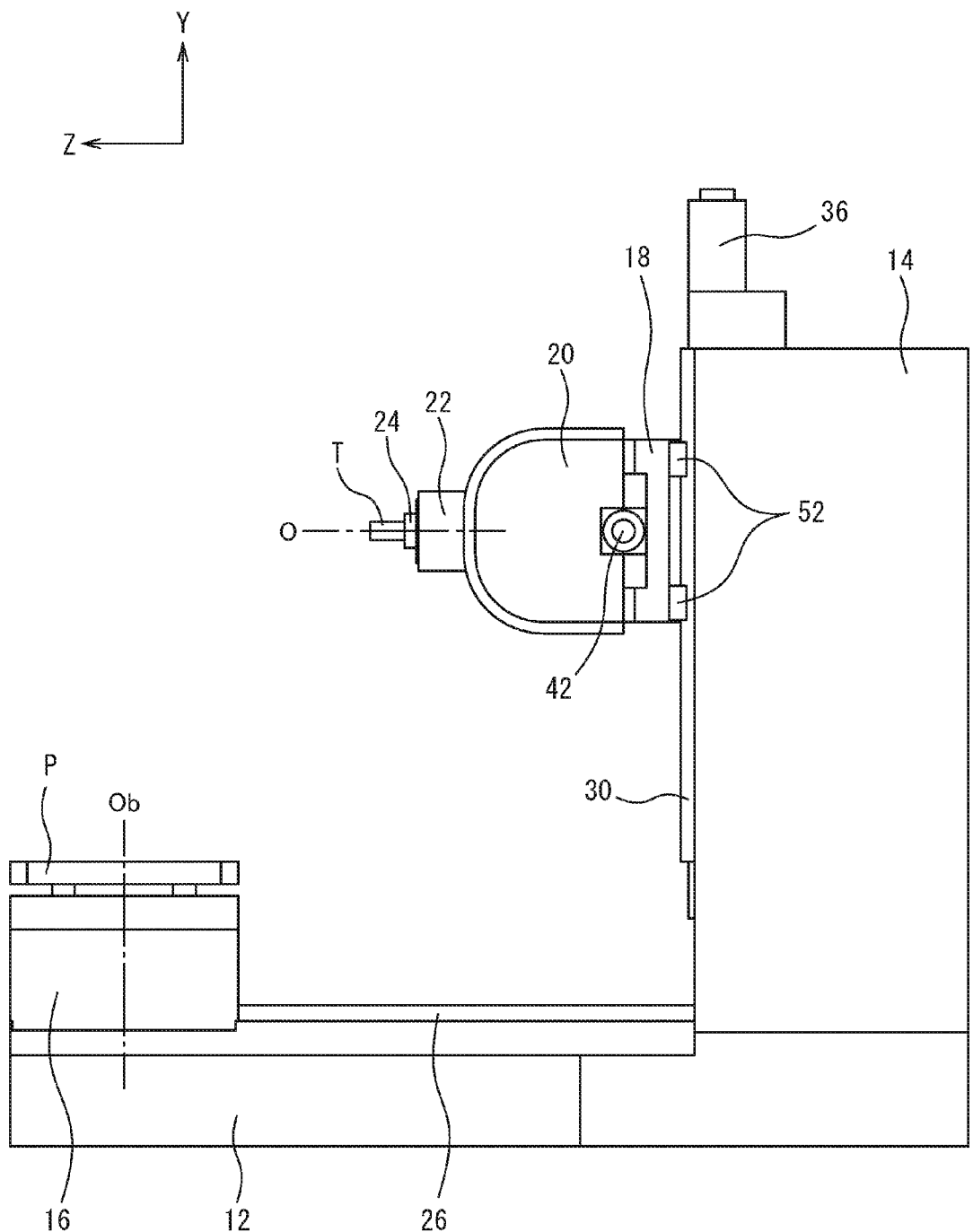
FIG. 3 is a side view of the machine tool of FIG. 1.

The table 16 is mounted for reciprocation along a pair of Z-axis guide rails 26 extending in the horizontal Z-axis direction (perpendicular to the plane of FIG. 2) on the top face of the bed 12. A pallet P, for securing a workpiece (not shown) is attached to the top face of the table 16. In this embodiment, a B-axis servomotor (not shown) is incorporated in the table 16 so as to support the pallet P for B-axis rotational feed around an axis Ob.

The bed 12 is provided with a Z-axis feed device for reciprocating the table 16 along the Z-axis guide rails 26, including a ball screw 28 extending in the Z-axis direction and a Z-axis servomotor 29 coupled to an end of the ball screw 28. The table 16 is provided with a nut (not shown) which engages the ball screw 28.

The Y-axis slider 18 is mounted for reciprocation along a pair of Y-axis guide rails 30, extending in the Y-axis direction (the vertical direction), and the pair of guide surfaces 32 in the front face of the column 14. The column 14 is provided with a Y-axis feed device for reciprocating the Y-axis slider 18 along the Y-axis guide rails 30 and the guide surfaces 32, including a ball screw 34 extending in the Y-axis direction and a Y-axis servomotor 36 coupled to an end of the ball screw 34. The Y-axis slider 18 is provided with a nut (not shown) which engages the ball screw 34.

The X-axis slider 20 is mounted for reciprocation along a pair of X-axis guide rails 38 extending in the X-axis direction (right-and-left direction in FIG. 2) on the front face of the Y-axis slider 18. The Y-axis slider 18 is provided with an X-axis feed device for reciprocating the X-axis slider 20 along the X-axis guide rails 38, including a ball screw 40 extending in the X-axis direction and an X-axis servomotor 42 coupled to an end of the ball screw 40. The X-axis slider 20 is provided with a nut (not shown) which engages the ball screw 40.

The X-axis slider 20 has a pair of A-axis arms 20a extending in the Z-axis direction. The spindle head 22 is supported between the A-axis arms 20a for A-axis rotational feed around a tilting axis Oa parallel to the X-axis. An A-axis servomotor (not shown), for rotationally feeding the spindle head 22 in the A-axis rotational feed direction around the tilting axis Oa, is incorporated in one of the A-axis arms 20a. The spindle head 22 supports the spindle 24 for rotation around an axis O. A servomotor 24, for rotationally driving the spindle 24, is incorporated in the spindle head 22.

Accordingly, a tool T attached to the end of the spindle 24 and a workpiece secured to the pallet P which is mounted to the table 16 are relatively moved by relatively feeding the X-, Y-, Z-, A- and B-axes in accordance with an NC program whereby the machine tool 10 machines the workpiece with the tool T.

As described above, the Y-axis slider 16 is guided in the up-and-down direction by the pair of Y-axis guide rails 30 and the pair of guide surfaces 30. In this embodiment, the pair of Y-axis guide rails 30 is disposed in the front face of the column 14. The pair of guide surfaces 32 is disposed in the recess 42 so as to forwardly face in the Z-axis. The recess is formed in the front face 46 of the column 14 to have a section perpendicular to the Y-axis in the form of substantially trapezoidal shape. Accordingly, the pair of Y-axis guide rails 30 are disposed in the column 14, relative to the guide faces 32, forward in the Z-axis direction and outward in the X-axis direction. In particular, with reference to FIG. 14, the Y-axis guide rails 30 and the guide faces 32 are disposed at the respective vertexes of trapezoid 50 shown by the two-dot chain lines. Further, the pair of ball screws 34 are disposed substantially at the midpoints along the oblique sides of the trapezoid 50 between the Y-axis guide rails 30 and the guide surfaces 32. The positions of the ball screws 34 allows twisting moment, acting on the Y-axis slider 18 and generated by the axial thrust forces of the ball screws 34, to be effectively received by the first and second guides whereby the twisting deformation of the Y-axis slider 18 is prevented or reduced.

A pair of carriages 52, engaging the Y-axis guide rails 30, is mounted to the Y-axis slider 18. In this embodiment, the carriages 52 are rolling type carriages, including rolling elements, such as a plurality of rollers or balls, so that the Y-axis guide rails 30 form a rolling type guide.

Figure 6:
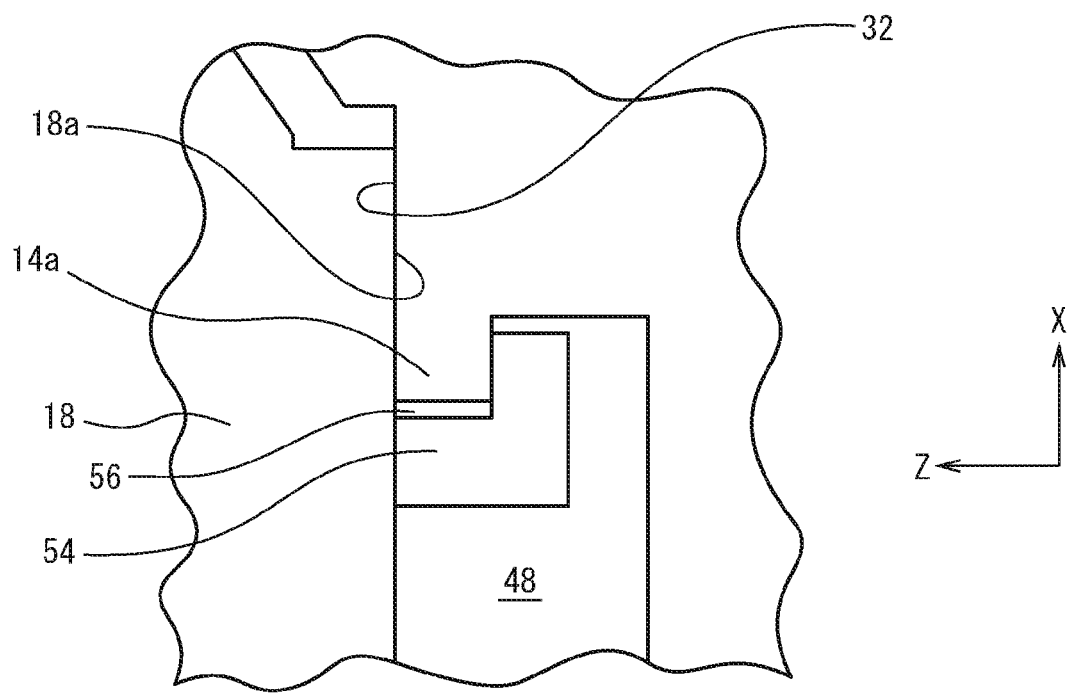
FIG. 6 is an enlarged view of a portion indicated by VI in FIG. 4.

In particular, with reference to FIG. 6, the Y-axis slider 18 has holding plates 54, which engage the protrusions 14a, and sliding surfaces 18a which slide relative to the guide surfaces 32. The holding plates 54 slidably and intimately contact the backs of the protrusions 14a whereby the sliding surfaces 18a of the Y-axis slider 18 are pressed to the guide surfaces 32. Accordingly, the guide surfaces 32 form a sliding type guide. In this connection, gaps 56 are provided between the sides of the protrusions 14a and the holding plates 56.

In this embodiment, the Y-axis slider 18 is mounted to the column 14 for the up-and-down movement by the second guide, composed of the combinations of at least one, preferably the pair of inner guide surfaces 32 and the sliding surfaces 18a, and the protrusions 14a and the holding plates 54, in addition to the first guide, composed of the combination of the pair of outer Y-axis guide rails 30 and the carriages 52. Accordingly, the back side of the Y-axis slider is restricted by the guide surfaces 32 so that the twisting deformation of the Y-axis slider 18 about the X-axis, due to the weight of the X-axis slider 20 and the spindle head 22 and the cutting force acting on the spindle 24 in the Y-axis direction, is prevented or reduced. In particular, the sliding surfaces 18a of the Y-axis slider 18 is pressed to the guide surfaces 32 by slidably and intimately contacting the holding plates 54 with the backs of the protrusions 14a, minimizing the deformation of the Y-axis slider.

Further, the configuration in which the distance between the pair of second guides is smaller than the distance between the pair of first guides allows the Y-axis slider to be smaller and lighter compared with a configuration in which the distance between the pair of first guides and the distance between the pair of second guides are the same, whereby the load acting on the Y-axis in the direction of the gravity can be reduced.

While the machine tool is shown in FIG. 1 as a type of horizontal spindle having a horizontally oriented spindle, the provision of the A-axis allows the machine tool to be used as a machine tool provided with a vertical spindle by orienting the spindle in the vertical direction. The invention can be applied to a vertical machine tool which does not have an A-axis.

The deformation of the Y-axis slider 18 can be minimized in either case in which both the first and second guides are formed by guide surfaces and sliding surfaces, or in which both the first and second guides are formed by guide rails and carriages. In this embodiment, by forming the first guide, of which the pair of guides is widely spaced, with rolling type guides, the friction coefficient is reduced, and the adjustment of the parallelism in the Y-axis direction is facilitated. The disposition of the second guide, formed with the sliding guides, inward and rearward relative to the first guide, results in increase in frictional dumping capacity, and allows the force, tending to tilt the Y-axis slider 18 forwardly, to be received by the backs of the protrusions 14 and the guide surfaces 32 whereby the Y-axis slider 18 is prevented from forwardly tilted.

REFERENCE SIGNS LIST

10 Machine Tool
12 Bed
14 Column
14a Protrusion
16 Table
18 Y-axis Slider
18a Sliding Surface
20 X-axis Slider
22 Spindle Head
30 Y-axis Guide Rail
32 Guiding Surface
50 Trapezoid
52 Carriage
54 Holding Plate

The invention claimed is:

1. A machining tool for machining a workpiece, which is attached to a table, by moving a tool attached to a spindle and the workpiece relative to each other, the machine tool comprising:
a column having a front face having a recess therein, and Y-axis guides in an up-and-down direction that is the direction of gravity, the Y-axis guides being provided on the front face of the column;
a moving body configured to move along the Y-axis guides in front of the column, and having an X-axis guide in a right-and-left direction; and
a spindle head configured to move along the X-axis guide in front of the moving body,
wherein the Y-axis guides include a first guide disposed outside the recess, and a second guide disposed inward relative to the first guide and within the recess,
wherein the first guide includes a pair of right and left first guide rails mounted on the front face of the column to extend in the up-and-down direction, and the second guide includes a pair of forwardly facing guide surfaces defined by the column,
wherein the recess of the column has, in a plane perpendicular to the up-and-down direction, a shape of a trapezoid,
wherein, in the plane, the pair of guide rails of the first guide are disposed at a first pair of vertexes of the trapezoid and located outside the recess, and the pair of guide surfaces of the second guide are disposed at a second pair of vertexes of the trapezoid and located inside the recess.

2. The machine tool according to claim 1, wherein the moving body includes carriages engaging the pair of guide rails and sliding surfaces sliding along the pair of forwardly facing guide surfaces, and wherein the carriages include rolling elements.

3. The machine tool according to claim 1, further comprising a feed device for driving the moving body in the up-and-down direction, wherein the feed device comprises a pair of ball screws mounted to the column and extending in the up-and-down direction; a servomotor coupled to an end of each of the ball screws; and nuts mounted to the moving body for engaging the ball screws.

4. The machine tool according to claim 1, wherein the column includes protrusions extending inwardly from side walls of the recess and extending in the up-and-down direction, the protrusions defining front faces, flush with the pair of forwardly facing guide surfaces, and rear faces opposite to the front faces, and wherein the moving body is provided with holding plates engaging the rear faces of the protrusions.

5. The machine tool according to claim 1, wherein primary surfaces of the pair of guide rails are parallel with the pair of forwardly facing guide surfaces.

* * * * *